(12) United States Patent
Hussaini

(10) Patent No.: US 6,356,050 B1
(45) Date of Patent: Mar. 12, 2002

(54) PORTABLE BOOSTER SUPPLY WITH WIRELESS REMOTE CONTROL ACTIVATION

(75) Inventor: Saied Hussaini, Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 0 days.

(21) Appl. No.: 09/544,139

(22) Filed: Apr. 6, 2000

(51) Int. Cl.[7] .................... H01M 10/44; H01M 10/46
(52) U.S. Cl. ................................................ 320/105
(58) Field of Search ............................. 320/103, 104, 320/105, 114, 115, 165; 307/44, 46, 48

(56) References Cited

U.S. PATENT DOCUMENTS

| | | |
|---|---|---|
| 3,341,762 A | 9/1967 | Rockoff |
| 3,343,057 A | 9/1967 | Smith |
| 4,039,903 A | 8/1977 | Russell |
| 4,163,134 A | 7/1979 | Budrose |
| 5,094,635 A | 3/1992 | Thompson et al. |
| 5,401,924 A | 3/1995 | Armanno, Sr. |
| 5,635,818 A * | 6/1997 | Quintero |

* cited by examiner

Primary Examiner—Edward H. Tso
(74) Attorney, Agent, or Firm—Liniak, Berenato, Longacre & White

(57) ABSTRACT

A portable battery booster supply having a wireless remote control activation device. The hand held battery booster has connecting jumpers adapted to be connected to the battery posts of a vehicle battery. The booster includes a rechargeable battery contained within the housing and a means to connect to an adapter charger. The portable booster also contains a receiver/controller for selectively switching/controlling voltage supplied to the positive jumper. A small hand held transmitter produces radio signals, or other electromagnetic signals that communicates with the controller. The transmitter has an on switch and an off switch for selectively sending a transmitting signal to the controller in the portable booster. The controller has a preset code to compare the signals received from the hand held transmitter to selectively activate the positive jumper lead. When an off signal is received the controller operates a switch to open the circuit between the rechargeable batteries and the positive jumper. Similarly, when an on signal is received, the controller operates the switch to close the circuit between the battery and the positive jumper cable to provide voltage thereto. This arrangement allows a user to make the connections between the booster battery and the battery to be charges and activate the voltage supply from a safe remote location.

6 Claims, 1 Drawing Sheet

PORTABLE BOOSTER SUPPLY WITH WIRELESS REMOTE CONTROL ACTIVATION

BACKGROUND OF THE INVENTION

1. Field of the Invention

This invention is directed to a booster supply for boosting a run down vehicle battery and particularly is directed to a portable booster having a wireless remote control to remotely activate the supply of power from a safe distance.

2. Description of the Prior Art

Vehicular battery booster supplies are well known in the art. Historically, when a vehicle battery is run down to the point where there is insufficient voltage to start the vehicle, the battery must be jumped. This is often accomplished by jumping from a running vehicle or from a service vehicle. In such a case a live voltage source is connected to the run down battery to provide sufficient voltage to start the disabled vehicle. This operation often leads to unsafe conditions. Should the operator improperly make the electrical connection, or should a voltage surge occur, sparks can be generated. Vehicle batteries being jumped may produce hydrogen gas which can cause a fire or battery explosion causing severe injury to the operator. In an effort to increase safety in the boosting operation, it has been suggested to run wires from the voltage booster source to remotely activate the booster. Two such booster supplies are disclosed in U.S. Pat. Nos. 3,343,057 and 3,341,762 and are hereby incorporated herein by reference. However, these devices require a hard wire connection from the remote device to the service mounted booster supply. The use of a physical hard wire connection limits the range of use, reduces mobility, is expensive, bulky, and not easily adapted to be used with a portable hand carried device. The drawbacks of the hard wire remote activating switch are readily apparent.

It is also well known in the art to use wireless switching devices to remotely activate accessories within an automotive vehicle. Such devices are incorporated into keyless entry systems whereby an operator carries a small portable transmitter that selectively sends a radio signal to a control device in the vehicle to selectively operate vehicular accessories such as door locks, a power switch for the vehicle ignition and starter, or to disable a starting system. Two such keyless entry systems are disclosed in U.S. Pat. Nos. 5,689, 142 and 4,672,375 and are hereby incorporated herein by reference.

It is the object of the present invention to improve on the booster supply devices of the prior art. Specifically, it is the object of the present invention to incorporate a wireless remote control to safely activate a hand held portable booster from a remote location.

SUMMARY OF THE INVENTION

The present invention is directed to portable hand held booster supply having a wireless remote control activation device. The hand held battery booster has connecting jumpers adapted to be connected to the battery posts of a vehicle battery. The booster includes a rechargeable battery contained within the housing and a means to connect to an adapter charger. The portable booster also contains a receiver and controller module for selectively switching/ controlling voltage supplied to the positive jumper. A small hand held transmitter produces radio signals, or other electromagnetic signals, that communicates with the receiver/ controller. The transmitter has an on switch and an off switch for selectively sending a transmitting signal to the receiver/ controller in the portable booster. The receiver/controller has a preset code to compare the signals received from the hand held transmitter to selectively activate the positive jumper lead. When an off signal is received the receiver/controller operates a switch to open the circuit between the rechargeable battery and the positive jumper. Similarly, when an on signal is received, the receiver/controller operates the switch to close the circuit between the battery and the positive jumper cable to provide voltage thereto. This arrangement allows a user to make the connections between the booster battery and the battery to be charged and activate the voltage supply from a safe remote location.

DESCRIPTION OF THE PREFERRED EMBODIMENT

Figure 1:
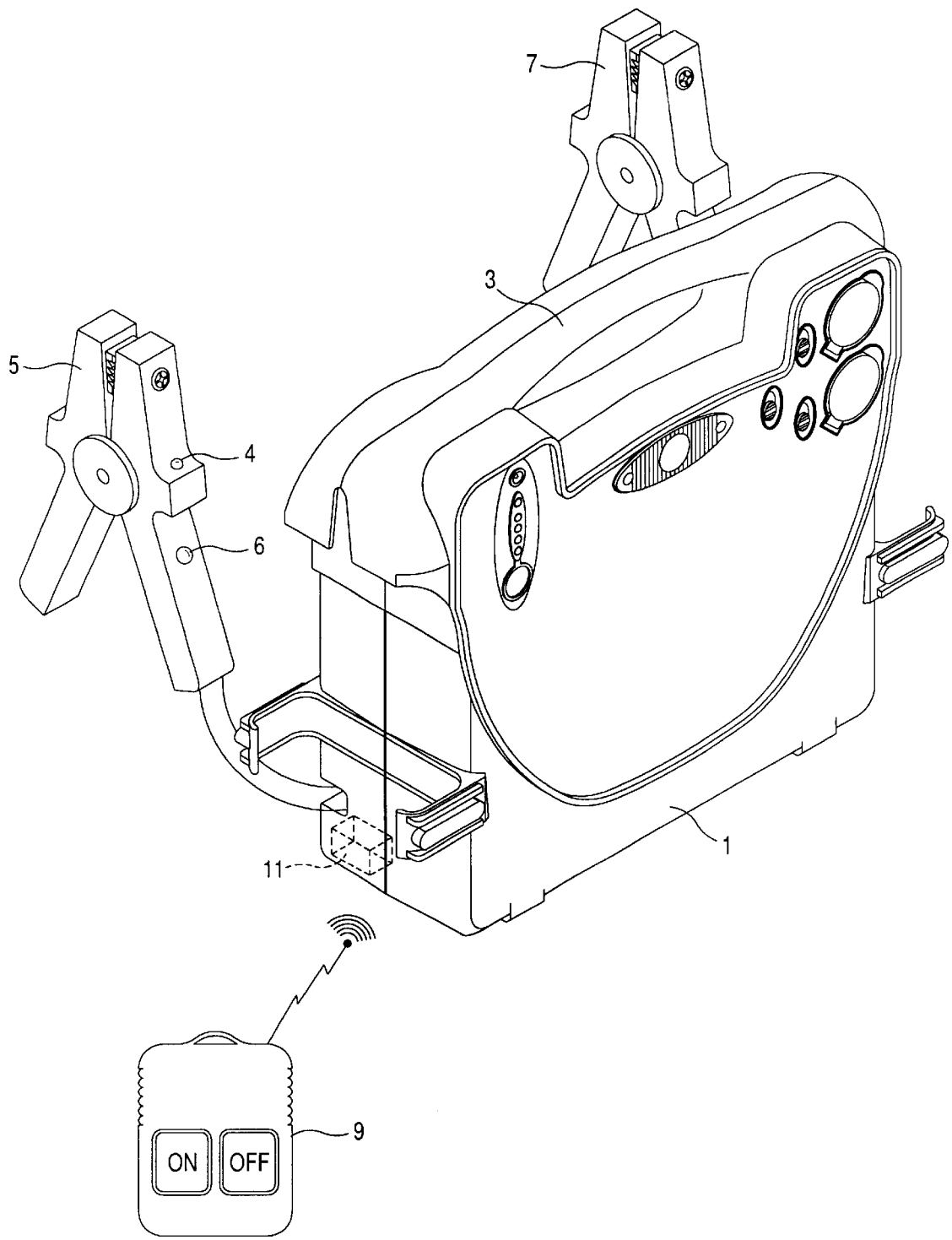
FIG. 1. is a perspective view of the portable booster device and wireless transmitter according to the present invention.

FIG. 1 depicts the portable battery booster having a case 1, a handle 3, a positive jumper clamp 5 and a negative jumper clamp 7 each connected to the portable booster via cables. The jumper clamps 5, 7 are conventionally formed and adapted to easily connect to a vehicle battery. Within the case 1 is a rechargeable internal battery providing a voltage source to the positive jumper 5 for jumping a low vehicle battery. The case further includes a connection means to connect the internal battery to an adapter charger or other charging device as is known in the art. An LED display is provided on the front of the booster case 1 in order to provide a signal representative of the charge capacity of the internal battery. A light is also provided to illuminate the area proximate the portable booster and vehicle battery while establishing a connection there between. A pair of auxiliary connecting ports, such as to accommodate a cigarette lighter adapter, are also provided to enable connection to auxiliary DC devices. Each of the light and auxiliary ports are provided with a switch to selectively provide voltage thereto.

A hand held wireless transmitter 9 is provided to selectively send a signal to a controller 11 disposed within the portable booster. The wireless transmitter 9 and controller/ receiver 11 devices may be as conventionally found in the keyless entry art and preferably act on radio frequency signals. The controller 11 is provided to selectively establish electrical connection between the internal battery and the positive jumper 5. Preferably, the wireless transmitter 9 has an on and off button to respectively send a closed an open signal. When the on button is pushed, the wireless transmitter 9 sends a closed signal to close a circuit between the internal battery and the positive jumper to provide voltage thereto. Similarly, when the off button is depressed, the wireless transmitter 9 sends an open signal to open the circuit between the internal battery and the positive jumper. This arrangement provides the ability to selectively activate the portable booster from a safe remote location.

In order to selectively connect and disconnect the internal battery from the positive jumper 5, a switch is disposed there between. The controller 11 simply activates the switch according to the signal received from the wireless transmitter. Preferably a relay switch or PCB board is disposed between the internal battery and the positive jumper 5.

The method of using the portable booster will now be explained. When attempting to boost a low vehicle battery, the wireless transmitter 9 is operated to disconnect the connection to the positive jumper 5. Specifically, the off button is pushed to disconnect the positive jumper 5 from the voltage source. Then the portably battery is positioned proximate the low vehicle battery. Once the positive jumper 5 is deactivated, the positive and negative jumpers 5,7 of the portable booster are properly connected to the low battery and vehicle as is known in the art. The operator then moves a safe distance from the portable booster and low battery before activating the voltage source. Preferably, the operator retreats to within the vehicle and assumes a position to start the vehicle. Such a position provides protection to the operator in the event the connections were improperly made or a fire explosion occurs from a faulty battery. Once the operator assumes a safe position, the on button of the transmitter 9 is depressed to send the closed signal. This establishes voltage to the positive jumper 5 and low battery. After sufficient time has elapsed to initially provide some charging to the low battery, the operator starts the vehicle. Once the vehicle is running properly the operator depressed the off button on the transmitter before leaving the vehicle. Once the voltage source is disconnected from the positive jumper, the portable booster may be disconnected from the low battery in the vehicle. The portable booster may then be stored within the vehicle trunk or other storage compartments.

A pushbutton switch 2 is disposed on an assessable portion of the connector.

The positive jumper clamp 5 may be provided with an additional safety feature. A light 4, preferably an LED, is disposed on the jumper clamp 5 to provide light when connecting to a battery terminal post. An electrical connection is established between a push button switch 6 and the cable of opposite polarity. When the switch 6 is activated, the booster voltage source activates the light 4 independent of a connection to the battery to be charged. Alternatively, a rear portion of the jumper clamp 5 may contained an independent battery source, such as an AA battery, for providing an independent voltage source for the light 4. In either circumstance, light 4 may be selectively illuminated both prior to and after connection is established with a battery to be charged.

While the foregoing invention has been shown and described with reference to a preferred embodiment, it will be understood by those possessing skill in the art that various changes and modifications may be made without departing from the spirit and scope of the invention.

What is claimed is:

1. A portable battery booster comprising:
   a case containing a voltage source and a positive and negative jumper provided for connection to a vehicle battery, said case containing a receiver/controller provided to selectively control a connection between said voltage source and said positive jumper; and
   a wireless transmitter adapted to transmit a signal to said controller, wherein said controller selectively connects said positive jumper to said voltage source in response to said signal.

2. The portable battery booster according to claim 1, further comprising:
   a switch disposed between said voltage source and said positive jumper, wherein said transmitter can selectively transmit one of an on and an off signal, said controller closing said switch in response to said on signal to provide said voltage source to said positive jumper and opening said switch to eliminate said connection between said voltage source and said positive jumper.

3. The portable battery booster according to claim 2, wherein said switch is one of a relay switch and a PCB board.

4. The portable battery booster according to claim 1, wherein said portable booster comprises a light to illuminate a working area proximate said vehicle battery.

5. The portable battery booster according to claim 1, wherein said booster has at least one auxiliary connection to connect said voltage source to an auxiliary device.

6. A method of boosting a vehicle having a low battery with a portable booster device, said method comprising the steps of:
   providing said portable booster device proximate said low battery;
   activating a wireless transmitter to send an open signal to said portable booster to disconnect a voltage source within said portable booster device;
   connecting said wireless booster device to said low battery;
   activating said wireless transmitter to send a closed signal to said portable booster to reconnect said voltage source thereby providing voltage to said low battery;
   starting said vehicle;
   activating said wireless transmitter to send said open signal thereby disconnecting said voltage source; and
   disconnecting said portable booster from said vehicle battery.

* * * * *